United States Patent
Suzuki et al.

[11] Patent Number: 5,446,328
[45] Date of Patent: Aug. 29, 1995

[54] MINIATURE MOTOR WITH PREASSEMBLED COMMUTATOR

[75] Inventors: Satoshi Suzuki; Michio Tsunoda; Kunitaka Murai; Katsumi Yamada, all of Chiba, Japan

[73] Assignee: Mabuchi Motor Co., Ltd., Matsudo, Japan

[21] Appl. No.: 235,912

[22] Filed: May 2, 1994

[30] Foreign Application Priority Data

Sep. 8, 1993 [JP] Japan .................................. 5-247593

[51] Int. Cl.⁶ ............................................. H02K 13/04
[52] U.S. Cl. .................................. 310/233; 310/234; 310/235; 310/236
[58] Field of Search ................. 310/40 MM, 233, 234, 310/235, 236, 237

[56] References Cited

U.S. PATENT DOCUMENTS

| | | | |
|---|---|---|---|
| 2,322,020 | 6/1943 | Hemphil | 310/237 |
| 4,833,357 | 5/1989 | Tamura et al. | 310/236 |
| 4,855,632 | 8/1989 | Baines . | |
| 5,272,404 | 12/1993 | Yuhi et al. | 310/233 |
| 5,357,159 | 10/1994 | Hagiwara et al. | 310/40 MM |

FOREIGN PATENT DOCUMENTS

| | | |
|---|---|---|
| 0148045 | 6/1989 | Japan ................................. 310/233 |
| 1-150464 | 10/1989 | Japan . |
| 4-275048 | 9/1992 | Japan . |
| 1449035 | 9/1976 | United Kingdom . |
| 2060274A | 4/1981 | United Kingdom . |

*Primary Examiner*—R. Skudy
*Attorney, Agent, or Firm*—Armstrong, Westerman, Hattori, McLeland & Naughton

[57] ABSTRACT

A miniature motor in which stators are mounted in an interior of a casing, and a preassembled commutator is provided on a rotor rotatably disposed to face the stators. The commutator has a sleeve body having a cylindrical portion provided with a flanged portion and a plurality of recesses, directed outwardly, in a side wall of the flanged portion, with the sleeve body being made of insulating material and mounted on a rotary shaft of the rotor. The commutator also has a plurality of conductive commutator pieces each having a body portion formed in an arcuate shape and mounted on an outer circumferential surface of the cylindrical portion, a terminal portion and at least one retainer portion, with each of the terminal portion and the retainer portion being received in the recesses.

29 Claims, 8 Drawing Sheets

MINIATURE MOTOR WITH PREASSEMBLED COMMUTATOR

BACKGROUND OF THE INVENTION

The present invention relates to a miniature electric motor for use in optical precision equipment such as compact camera, audio visual equipment such as a headphone stereo cassette tape recorder, and automotive electronic equipment. In particular, the invention relates to a miniature electric motor provided with a preassembled commutator.

Miniature motors have been widely used in various fields including the above-mentioned equipment and have been highly miniaturized to reduce their size and weight as well as their height.

In the motors, permanent magnets are mounted within an interior of a casing, and a rotor is disposed inside the permanent magnets. A rotary shaft of the rotor is rotatably supported by bearings mounted on the casing. A commutator is provided around the rotary shaft. Brushes mounted on the casing are slidingly engaged with the commutator.

Commutators which are components of the motors are classified into a mold type such that the entire structure is integrally formed of thermosetting resin and a preassembled type such that thermoplastics resin is used at dielectric parts.

The mold type and the preassembled type commutators are preferably selected depending upon revolving speed of the rotors or the circumstances where the motors are to be used. In general, it is preferable to use the preassembled type commutator for the case of the low revolving speed and to use the mold type commutator, which can withstand heat, for the case of the high revolving speed or a large size motor.

In the case where the revolving speed of the motor is low, since the current would be small to generate a small amount of heat and a low mechanical strength would suffice, a relatively thin metal plate would be used as commutator pieces of the preassembled commutator.

On the other hand, of the mold type commutator, since a relatively thick plate is used as commutator pieces and thermosetting rein is used for the dielectric parts, even if a large amount of current is caused to flow to generate a large amount of heat, a sufficient heat resistivity is insured. Accordingly, this type of the commutator is suitable for relatively large motors.

In contrast thereto, according to the preassembled commutator, there would be a fear that the thermoplastics resin or the commutator pieces would be molten by heat if a large amount of current would be caused to flow. It is necessary to reduce the amount of the heat. Accordingly, this type of the commutator is suitable for relatively small motors. Also, since the preassembled type commutator is small in size, a large mechanical strength would not be required.

For instance, a preassembled commutator is well known which is composed of a sleeve having a flanged portion at one end of a cylindrical portion, a plurality of commutator pieces made of metal and mounted around the sleeve, and a ring mounted around outer peripheries of the commutator pieces.

In such a commutator, means for fixing the plurality of commutator pieces to the sleeve is formed depending upon the pressure applied from the ring only. Accordingly, there is a fear that the commutator pieces would be offset in the circumferential direction when wirings of an armature are connected to terminal portions of the commutator pieces.

Also, one terminal portion is formed on each commutator piece and proximal portions of commutator pieces are depressed by the ring only. Accordingly, the mechanical strength of the commutator piece itself is low, and the fastening strength of the commutator piece to the sleeve is low, too. As a result, it would be difficult to make the outer circumferential surface of the plurality of commutator pieces into a true cylindrical shape.

Also, a distal end portion of each commutator piece would be raised radially outwardly, so that the true cylindrical shape of the outer circumferential surface would not be attained. The smaller the commutator, the more the assembling work would become difficult. Thus, the degradation of the true circle property of the outer circumferential surface would frequently be encountered.

SUMMARY OF THE INVENTION

Accordingly, in order to overcome the above-noted defects inherent in the prior art motors, an object of the present invention is to provide a miniature motor provided with a preassembled commutator which is capable of preventing the offset of commutator pieces by increasing a fastening strength of the commutator pieces to the sleeve.

Another object of the invention is to provide a miniature motor which can enhance a circularity of the outer circumferential surface of the preassembled commutator.

According to the invention, in order to attain these and other objects, a miniature electric motor is provided in which stators are mounted in an interior of a casing and a preassembled commutator is provided on a rotor rotatably disposed to face the stators, the preassembled commutator comprising:

a sleeve body having a cylindrical portion provided with a flanged portion and a plurality of recesses, directed outwardly, in a side wall of the flanged portion, the sleeve body being made of insulating material and mounted on a rotary shaft of the rotor; and a plurality of conductive commutator pieces each having a body portion formed in an arcuate shape and mounted on an outer circumferential surface of the cylindrical portion, a terminal portion and at least one retainer portion, each of the terminal portion and the retainer portion being received in the recesses.

The cylindrical portion of the sleeve body has a long structure in an axial direction. The flanged portion is formed at one end of the cylindrical portion opposite to one end face of the cylindrical portion. The cylindrical portion is integrally formed on one side of the flanged portion. A proximal portion is formed on the other side of the flanged portion for contacting with a rotor core of the motor and positioning the preassembled commutator. An outer diameter of the flanged portion is larger than outer diameters of the cylindrical portion and the proximal portion.

Preferably, the plurality of recesses are formed radially outwardly from a centerline of the sleeve body. An inner surface of each of the recesses is rectangular in cross section. The inner surface is defined by a bottom and a pair of inner side walls which face each other and extend perpendicular to the bottom.

A width (w) between the pair of inner side walls is substantially equal to or somewhat smaller than a width (w1) of the terminal portion and the retainer portion. As a result, the terminal portion and the retainer portion are press-fit to the recesses, and each back surface and each side surface of the terminal portion and the retainer portion are brought into intimate contact with the bottoms and the inner side walls of the recesses respectively.

Otherwise, the width (w) between the pair of inner walls is somewhat larger than the width (w1) of the terminal portion and the retainer portion, whereby the terminal portion and the retainer portion are fixed to the recesses with adhesives. Each back surface and each side surface of the terminal portion and the retainer portion are brought into intimate contact with the bottoms and the inner walls of the recesses respectively.

An inner surface of the body portion of the commutator piece has substantially the same radius of curvature as that of the outer circumferential surface, whereby the body portion comes into intimate contact with the outer circumferential surface.

When the commutator piece is mounted on the sleeve body, the body portion has such an axial length that its distal end is substantially flush with an end face of the cylindrical portion and such a circumferential length that a slit is formed so that a uniform dimension (d) is kept between the adjacent commutator pieces.

The sleeve body as a whole may be integrally made of insulating material such as thermoplastics resin. The commutator piece is made of conductive material such as copper and silver.

The terminal portion may have an elongated structure extending outwardly for connection with an armature winding. The retainer portion has a shortened structure so as not to extend beyond an outer circumferential surface of the flanged portion.

The number of the commutator pieces is the same as that of poles of the motor. The miniature motor may comprise a three-slot three-pole structure, wherein the preassembled commutator has three commutator pieces. Each commutator piece may have one terminal portion and one retainer portion.

The terminal portions and the retainer portions of the three commutator pieces are fixedly mounted within the recesses respectively. The three commutator pieces are uniformly arranged at 120° in the circumferential direction of the sleeve body.

The commutator may further comprise an insulating ring member for being brought into intimate contact with the outer circumferential surface of the body portion of the commutator piece mounted on the sleeve body and for causing the terminal portion and the retainer portion to enter the recesses.

The ring member is made of insulating material such as polyethylene resin. An inner diameter of the ring member is substantially equal to or somewhat larger than an outer diameter of the outer circumferential surface of the body portion of the commutator piece. The ring member is brought into contact with the terminal portion, the retainer portion and the side walls of the flanged portion.

A pair of flat portions for defining surfaces which are in parallel with each other are formed in the casing of the miniature motor. A mounting position of the terminal portion is offset from a center position (E) of one edge of the body portion, whereby the terminal portion is interposed in a space between adjacent armature windings.

Under the condition that the preassembled commutator is incorporated into the three-slot three-pole type motor, the terminal portions are mounted at 60° relative to a centerline of one pole of a rotor core.

The motor may be of a cylindrical type where the casing is cylindrical, wherein a mounting position of the terminal portion of the commutator piece is the center position (E) of the one edge of the body portion, the terminal portion is bent outwardly at the center position (E). The preassembled commutator are mounted on the rotary shaft of the rotor for positional adjustment so that the terminal portion is interposed in a space between adjacent armature windings.

A pair of the retainer portions are formed on both sides of the terminal portion of the commutator piece, each of the retainer portions being bent radially outwardly from the one edge. The recesses are formed in positions corresponding to the terminal portion and the retainer portions in the flanged portion of the sleeve body.

The commutator piece having the terminal portion and the retainer portions is symmetrical with respect to the center position (E) on right and left sides.

One retainer portion of the commutator piece is formed in the vicinity of the terminal portion and bent radially outwardly from the one edge. The recesses are formed in positions in correspondence with the terminal portion and the retainer portion.

DESCRIPTION OF THE PREFERRED EMBODIMENTS

Figure 13:
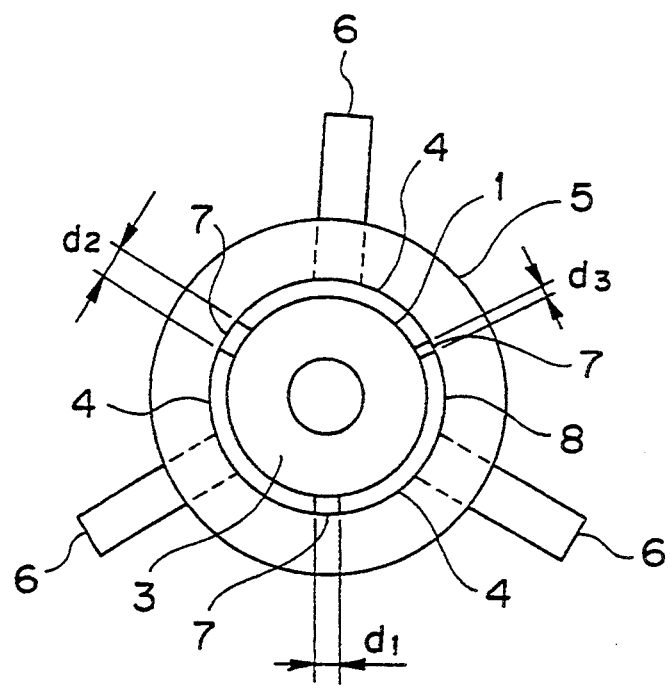
FIG. 13 is a side view showing a preassembled commutator to which the invention pertains.
Figure 14:
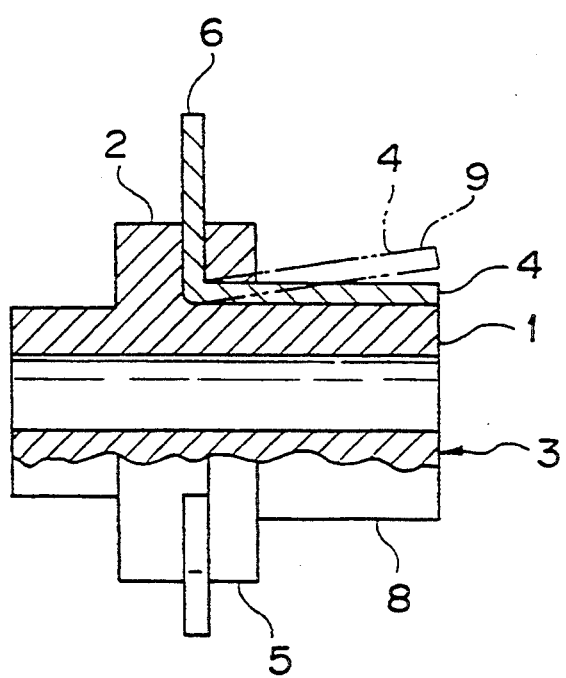
FIG. 14 is a partially fragmentary, longitudinal sectional view showing the preassembled commutator shown in FIG. 13.

A preassembled commutator for a miniature electric motor will now be described with reference to FIGS. 13 and 14 showing a related art to the present invention for the purpose of well understanding the concept of the invention.

As shown in FIGS. 13 and 14, the preassembled commutator is provided with a sleeve 3 having a flanged portion 2 at an end portion of a cylindrical portion 1, a plurality of three or more commutator pieces 4 made of metal and mounted on the sleeve 3, and a ring 5 mounted on outer surfaces of the commutator pieces 4. A single terminal portion 6 is formed on each of the commutator pieces 4 for connection with an armature winding.

In such a commutator, a fixing means for fixing the plurality of commutator pieces 4 to the sleeve 3 depends upon the pressure by the ring 5 only. Accordingly, when the armature winding is connected to the terminal portions 6, as shown in FIG. 13, the commutator pieces 4 would be offset in position in the circumferential direction. Therefore, each distance d1 through d3 between adjacent commutator pieces 4 would be non-uniform or the adjacent commutator pieces 4 would come into contact with each other.

Also, only one terminal portion 6 is formed on each commutator piece 4 and the ring 5 is used to press a distal end portion of each commutator piece 4 only. As a result, the mechanical strength of the commutator pieces 4 per se would be low and also a fastening strength of the commutator pieces 4 to the cylindrical portion 1 would be low. Therefore, it is difficult to form the outer circumferential surface 8, defined by the plurality of commutator pieces 4, into a true cylindrical shape.

For this reason, as shown in FIG. 14, a distal end portion 9 of each commutator piece 4 would be raised radially outwardly to degrade a circularity of the outer circumferential surface 8.

The present invention will now be described with reference to FIGS. 1 through 12.

Referring first to FIGS. 9 through 12, the overall structure of a miniature electric motor with a preassembled commutator in accordance with the invention will now be described.

Figure 9:
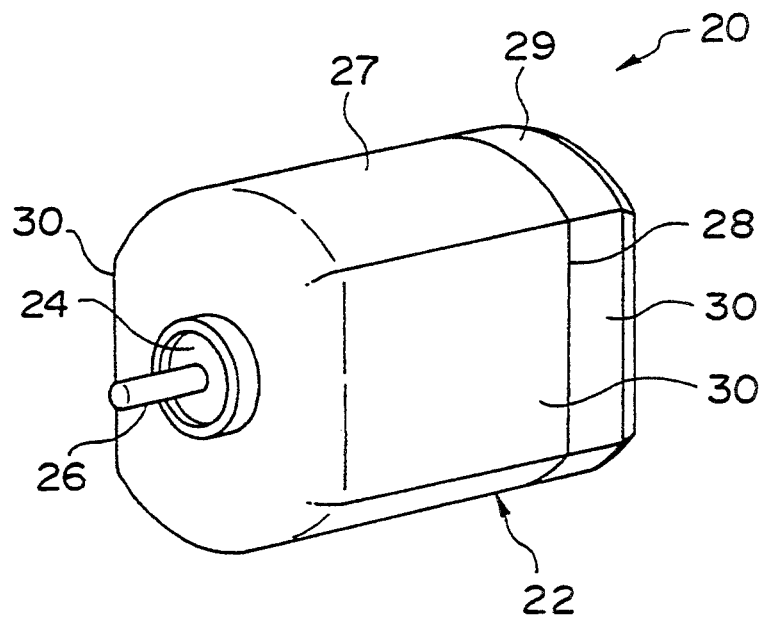
FIG. 9 is a perspective view showing an outer appearance of a miniature motor in which a casing has flat portions according to the invention.
Figure 10:
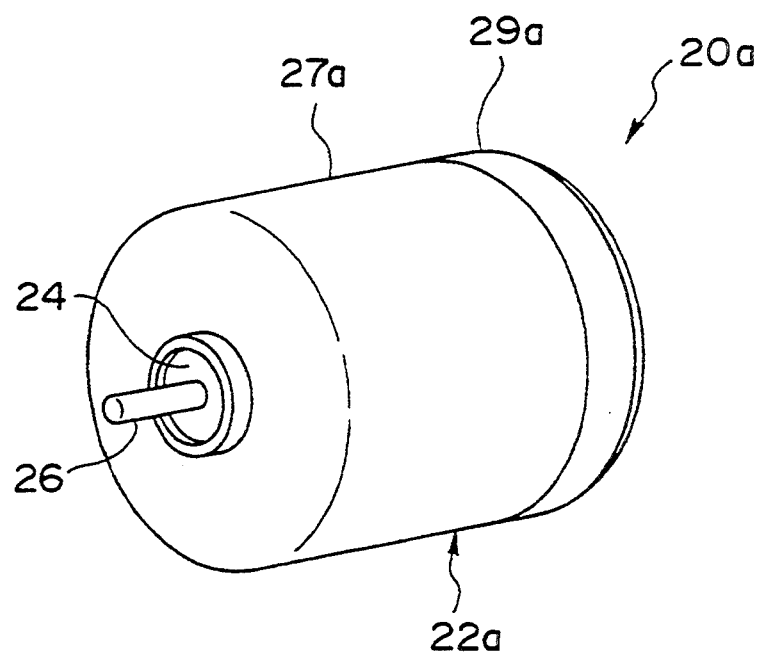
FIG. 10 is a perspective view showing a cylindrical type miniature motor.
Figure 11:
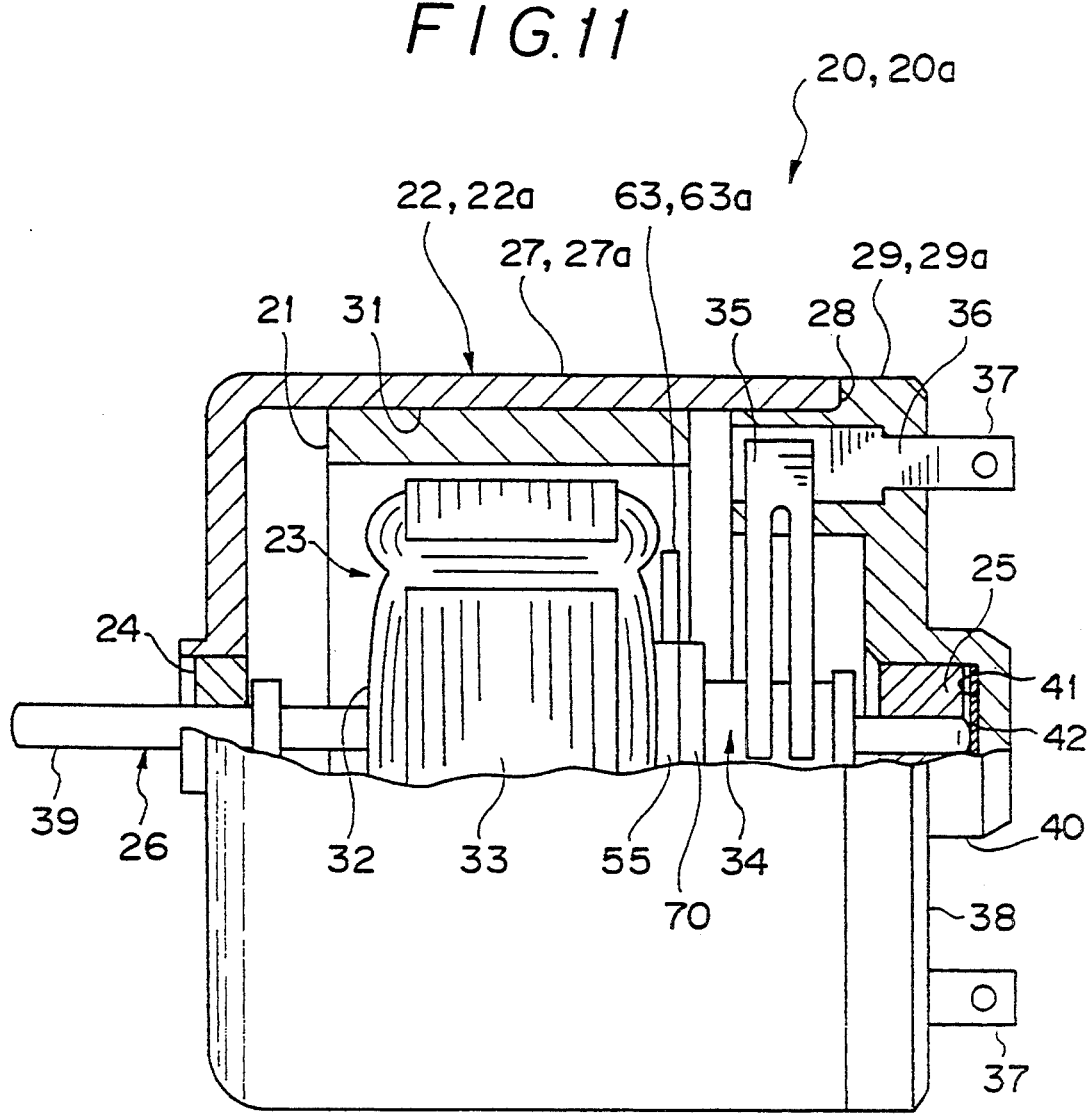
FIG. 11 is a partially fragmentary, longitudinal sectional view showing commonly the miniature motor shown in FIGS. 9 and 10.
Figure 12:
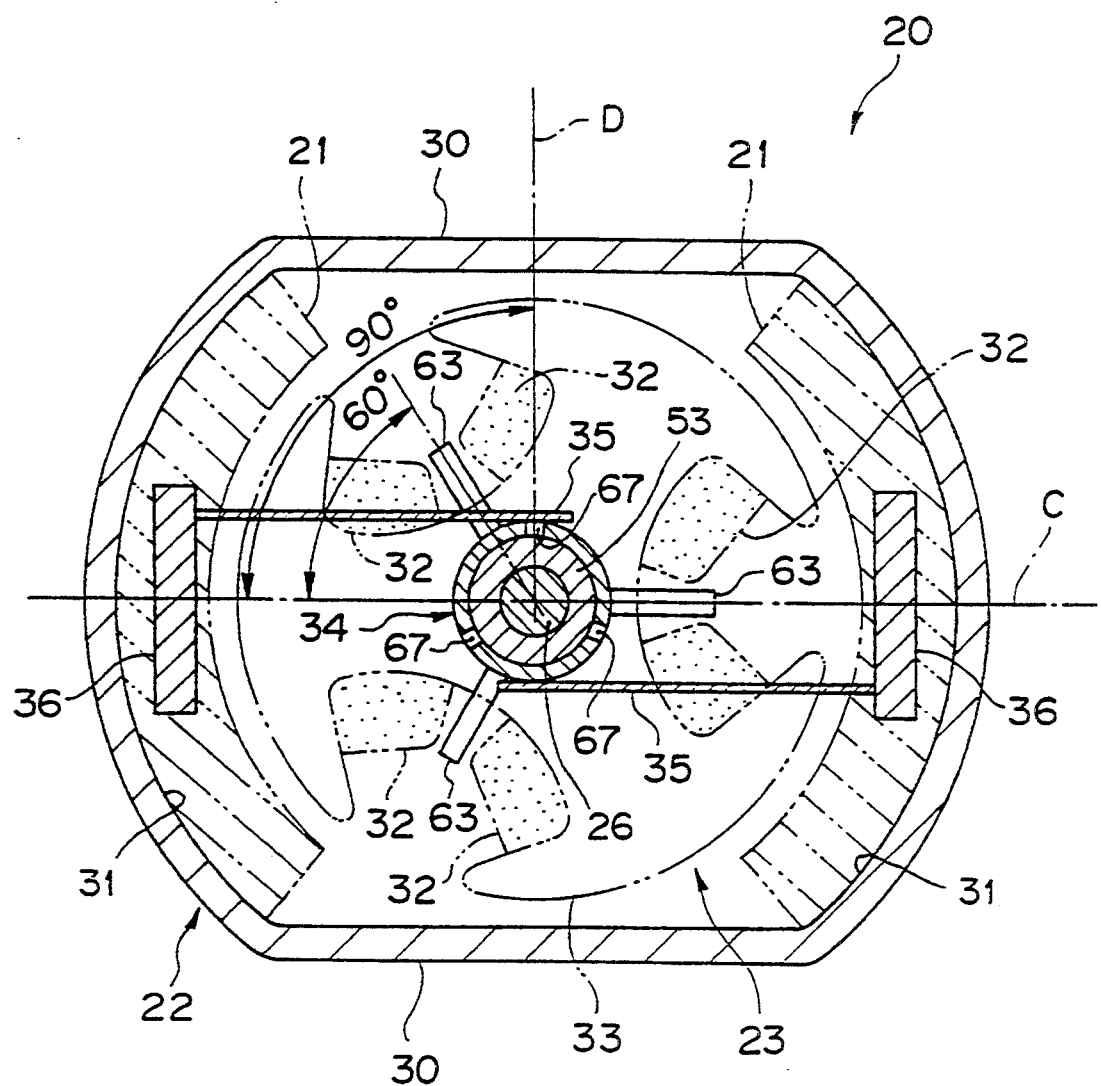
FIG. 12 is a cross-sectional view showing the flat type miniature motor shown in FIG. 9.

FIG. 9 is a perspective view showing an outer appearance of the miniature motor which is a so-called "flat type" motor in which flat portions are provided in a casing. FIG. 10 is a perspective view showing another type of the miniature motor which is a cylindrical type motor where no flat portions are provided in the casing. FIG. 11 is a longitudinal sectional view showing commonly the miniature motor shown in FIGS. 9 and 10. FIG. 12 is a cross-sectional view showing the flat type miniature motor shown in FIG. 9.

As shown in FIGS. 9 and 11, the miniature electric motor 20 is provided with stators 21 mounted within the casing 22 and a rotor 23 disposed within the casing 22 to face the stators 21. A rotary shaft 26 of the rotor 23 is rotatably supported by bearing members 24 and 25 provided in the casing 22.

The casing 22 is provided with a housing 27 formed into a bottomed hollow cylinder and a cap member 29 made of insulating material and fitted on an opening portion 28 of the housing 27. The housing 27 is made of metal material such as a cold rolled steel plate made mainly of soft steel and the cap member 29 is made of resin material or any other insulating material, for example. A pair of flat portions 30 which are parallel to each other are formed in the casing 22.

A thrust bearing 42 is pressingly inserted into an inner bottom portion 41 of a bearing receiving portion 40 formed in the cap member 29. The thrust bearing 42 is made of a circular metal plate or a circular synthetic resin plate for supporting the rotating rotary shaft 26 in the thrust direction (i.e., axial direction).

As shown in FIGS. 11 and 12, the stators 21 are fixed to circular inner circumferential surfaces 31 of an inner surface of the housing 27. The stators 21 are composed of, for example, a pair of permanent magnets formed into arcuate segments and made of magnetic material such as hard ferrite.

The rotor 23 is provided with the rotary shaft 26 extending in a centerline direction for rotation, a rotor core 33 mounted around the rotary shaft 26, and a preassembled commutator 34 mounted on the rotary shaft 26 and electrically connected to an armature winding 32. The armature winding 32 is wound in shape of coil around the rotor core 33. The rotor core 33 is disposed with a predetermined air-gap relative to the stators 21 and inside the latter.

A plurality of two or more sets of brushes 35, which are made of conductive material, are provided in the cap member 29 and come into sliding contact with the preassembled commutator 34 to allow a current to flow therebetween. A plurality of one pair or more connecting terminals 36 electrically connected to the respective brushes 35 are mounted on the cap member 29. A terminal portion 37 of each connecting terminal 36 extends outwardly from a surface 38 of the cap member 29.

Incidentally, the motor 20 is of a three-slot three-pole structure as shown in FIG. 12.

In the motor 20 having the above-described structure, the current will flow from the connecting terminals 36 through the brushes 35 and the commutator 34 to the armature winding 32. Then, a rotational torque will be applied to the rotor 23 which is disposed in a magnetic field formed by the stators 21 made of the pair of permanent magnets so that the rotor 23 will take a rotational motion.

Thus, the motor 20 will drive an optical precision device (not shown) through an output portion 39 of the rotary shaft 26 which is rotating.

A miniature motor 20a shown in FIG. 10 is of a cylindrical type where no flat portions shown in FIG. 9 are provided. A casing 22a having a circular shape in cross section is provided with a housing 27a and a cap member 29a fitted in the housing 27a. The internal structure of the motor 20a is the same as that shown in FIG. 11.

The preassembled commutator will be described hereunder.

Figure 1:
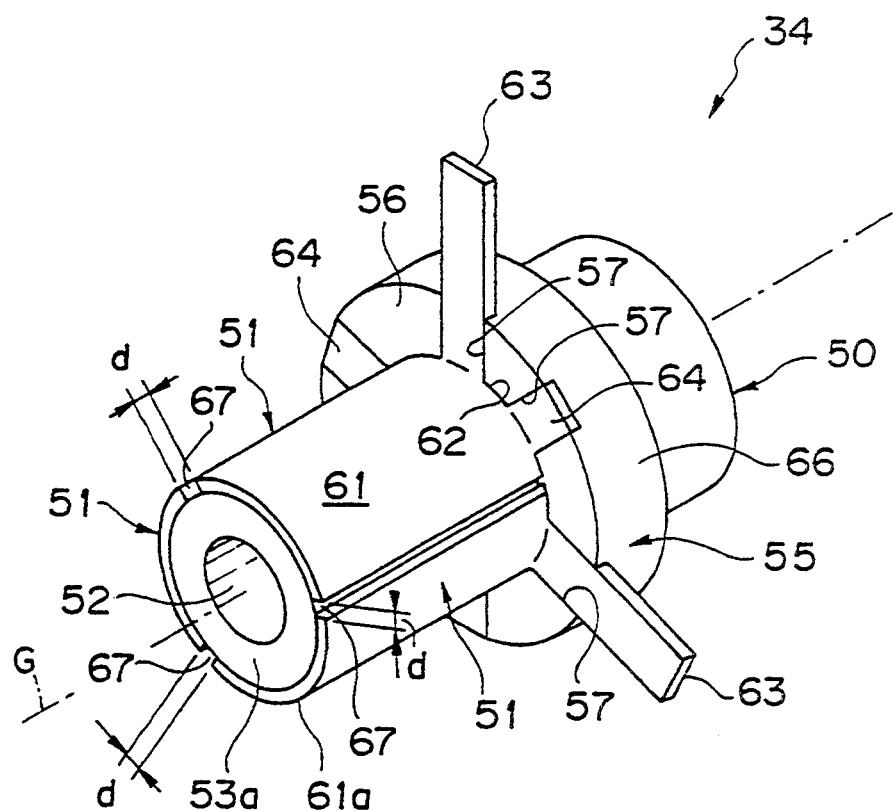
FIG. 1 is a perspective view showing a commutator having commutator pieces in accordance with the first embodiment of the present invention.
Figure 2:
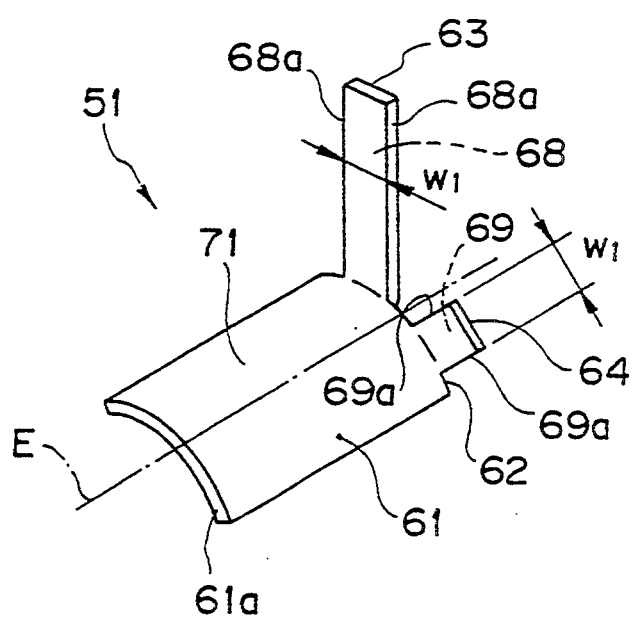
FIG. 2 is a perspective view showing the commutator piece of the commutator shown in FIG. 1.
Figure 3:
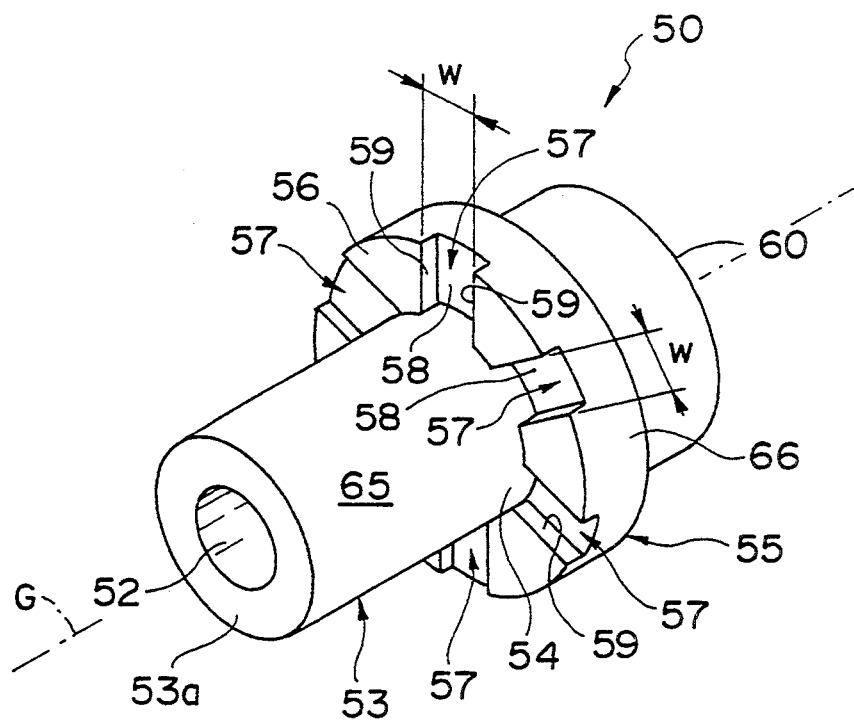
FIG. 3 is a perspective view showing a sleeve member of the commutator shown in FIG. 1.

FIGS. 1 through 3 show the first embodiment of the invention. FIG. 1 is a perspective view showing an outer appearance of the preassembled commutator. FIG. 2 is a perspective view showing a commutator piece of the commutator shown in FIG. 1. FIG. 3 is a perspective view showing a sleeve of the commutator shown in FIG. 1.

As shown in FIG. 1, the preassembled commutator 34 is provided with an insulating sleeve body 50 mounted on the rotary shaft 26 of the rotor 23 shown in FIG. 11 and a plurality of conductive commutator pieces 51 mounted on the sleeve body 50. The sleeve body 50 is made of electrical insulating material such as a thermoplastic resin. Each commutator piece 51 is made of conductive material such as copper and silver. In the embodiment, since the motor 20 is of the three-slot three-pole structure, the preassembled commutator 34 is provided with the three commutator pieces 51.

As shown in FIGS. 1 and 3, the sleeve body 50 as a whole is formed integrally. A through-hole 52 into which the rotary shaft 26 is to be inserted is formed in the central portion of the sleeve body 50.

A cylindrical portion 53 of the sleeve body 50 has a long axial length. A flanged portion 55 is formed at one end portion 54 of the cylindrical portion 53 opposite to an end face 53a thereof. A plurality (six in the embodiment) of recesses 57 are formed in a side wall 56 of the flanged portion 55. The side wall 56 is positioned to a side of the cylindrical portion 53. The recesses 57 are directed radially outwardly from a centerline G of the sleeve body 50. Incidentally, it is sufficient that the recesses 57 extend outwardly and may be eccentrically offset from the centerline G. An inner surface of each recess 57 is rectangular in cross section and is defined by a bottom 58 and a pair of facing inner side walls 59 perpendicular to the bottom 58.

The cylindrical portion 53 is provided on one side of the flanged portion 55, whereas a proximal portion 60 is provided on the other side of the flanged portion 55 for contacting with the rotor core 33 and positioning the preassembled commutator 34 in place. These components are formed integrally. An outer diameter of the flanged portion 55 is larger than outer diameters of the cylindrical portion 53 and the proximal portion 60.

As shown in FIGS. 1 and 2, the commutator pieces 51 mounted on the sleeve body 50 are each provided with a body portion 61 formed into an arcuate shape in cross section, a terminal portion 63 for connection with the armature winding 32, and a retainer portion 64 positioned in the vicinity of the terminal portion 63 to thereby form an integral structure. The terminal portions 63 and the retainer portions 64 are bent outwardly (for example, radially outwardly) from arcuate first edges 62 of the body portions 63.

An inner surface of each body portion 61 has substantially the same radius of curvature as that of an outer circumferential surface 65 of the cylindrical portion 53 whereby the body portion 61 may be in intimate contact with the outer circumferential surface 65. When the commutator pieces 51 are mounted on the sleeve body 50, each body portion 61 has such an axial length that its distal end 61a is substantially flush with the end face 53a of the cylindrical portion 53. Also, each body portion 61 has such a circumferential length that a slit 67 is formed under the condition that a substantially constant dimension d is kept between the adjacent commutator pieces 51.

When the terminal portions 63 and the retainer portions 64 of the three commutator pieces 51 are received in and fixed to the recesses 57 of the flanged portion 55, respectively, the three commutator pieces 51 are uniformly arranged in the circumferential direction of the sleeve body 50 at 120°. Thus, the preassembled commutator 34 is completed.

The means for fixing the terminal portions 63 and the retainer portions 64 into the recesses 57 is preferably constituted as follows. A width w between the facing inner walls 59 of each recess 57 is equal to or somewhat smaller than a width w1 of each terminal portion 63 and/or each retainer portion 64. This dimensional relationship causes the terminal portion 63 and/or retainer portion 64 to pressingly fit the recess 57. Incidentally, the width w may be somewhat larger than the width w1. In this case, the terminal portion 63 and the retainer portion 64 are to be fixed to the recesses 57 with adhesives.

Thus, the press-fit means or adhesives are used. Respective back surfaces 68 and 69 of the terminal and retainer portions 63 and 64 and respective side surfaces 68a and 69a of the terminal and retainer portions 63 and 64 are fixedly brought into intimate contact with the bottoms 58 and the inner side walls 59 respectively. As a result, the intimate contact area is much increased in comparison with that obtained by the conventional technique, thereby considerably improve the fastening strength of the commutator pieces 51 to the sleeve body 50.

Since the terminal portions 63 are connected through wirings to the armature winding 32, it is preferable to take a long structure that the terminal portions 63 extends radially outwardly for easy connection. However, it is preferable to take a short structure for the retainer portions 64 so that the retainer portions do not extend beyond the outer circumferential surface 66 of the flanged portion 55. If the retainer portions 64 would extend exceeding the outer circumferential surface 66 of the flanged portion 55, the retainer portions 64 would be brought into contact with the armature winding 32 wound around the rotor core 33 so that there would be a short-circuit. This can be avoided to meet the above-described condition.

Thus, if the terminal portions 63 and the retainer portions 64 of the three commutator pieces 51 are mounted in and fixed to the respective recesses 57, the respective commutator pieces 51 are uniformly arranged in the circumferential direction and the displacement of the pieces 51 therein may be avoided.

As a result, the slit 57 between each adjacent portions 61 may be kept constant at dimension d to enhance reliability. Also, even when the armature winding 32 is to be wound around the rotor core 33 and is connected to the terminal portions 63 (not shown), or when vibrations due to the motor rotation or any other external forces are applied, there is no fear that the commutator pieces 51 would be drawn in the circumferential direction to cause any positional displacement. Thus, it is possible to avoid the conventional defects.

The retainer portions 64 are provided in addition to the terminal portions 63 and these are fixed in the recesses 57. Accordingly, the mechanical strength of the commutators 51 per se is enhanced and the fastening strength of the commutator pieces 51 to the sleeve body 50 is also enhanced. With such a structure, unlike the conventional technique, it is possible to obviate the fear that the distal end portions 61a of the commutator pieces 51 would be inadvertently raised, thereby improve a circularity of the outer circumferential surface of the commutator 34 which has been preassembled.

When the commutator 34 is preassembled or fabricated, it is sufficient to mount the terminal portions 63 and the retainer portions 64 into the respective recesses 57. Accordingly, it is possible to accurately position the small size commutator pieces 51 in the circumferential direction. It is therefore possible to enhance the circularity even with the miniature commutator.

The commutator pieces 51 in connection with the foregoing embodiment is preferably used in the flat type miniature motor 20 in which the pair of flat portions 30 are formed in the casing 22.

Namely, as shown in FIG. 12, an internal space of the motor 20 is particularly small at positions corresponding to the flat portions 30. Accordingly, the pair of stator 21 and the pair of connecting terminals 36 are juxtaposed on a centerline C extending in the longitudinal direction and arranged to intersect with the centerline C. The pair of brushes 35 extending from the respective connecting terminals 36 toward the preassembled commutator 34 are mounted in parallel to the centerline C.

When a centerline of one pole of the rotor core 33 is identical with the centerline C of the stators 21, an electrical switching of the armature winding 32 is performed to rotate the rotor 23. Accordingly, under this switching moment, it is necessary to locate one slit 67 in the direction of a centerline D which is perpendicular to the centerline C.

Meanwhile, the terminal portions 63 are located between the adjacent armature windings 32 wound around the respective poles of the rotor core 33. The reason for this is that, since the winding operation of the armature windings 32 is usually carried out after the preassembled commutator 34 has been preassembled on the rotary shaft 26 upon the motor fabrication, if the terminal portions 63 would be located in the winding positions, the terminal portions 63 would obstruct the winding operation when the armature windings 32 are wound around the rotor core 33. Also, the additional reason is that a sufficient amount of the armature windings 32 could be mounted on the rotor core 33.

Accordingly, under the condition that the preassembled commutator 34 is incorporated into the three-slot three-pole type motor 20, the terminal portions 63 is most preferably mounted at an angle of 60° relative to the centerline of one pole of the rotor core 33.

For those reasons, in the preferred embodiment, as shown in FIGS. 1, 2 and 12, the mounting position of the terminal portions 63 to the body portion 61 is offset from a center position E of one edge 62 of each body portion 61, whereby the terminal portion 63 is interposed in a space between the adjacent armature windings 32.

Figure 4:
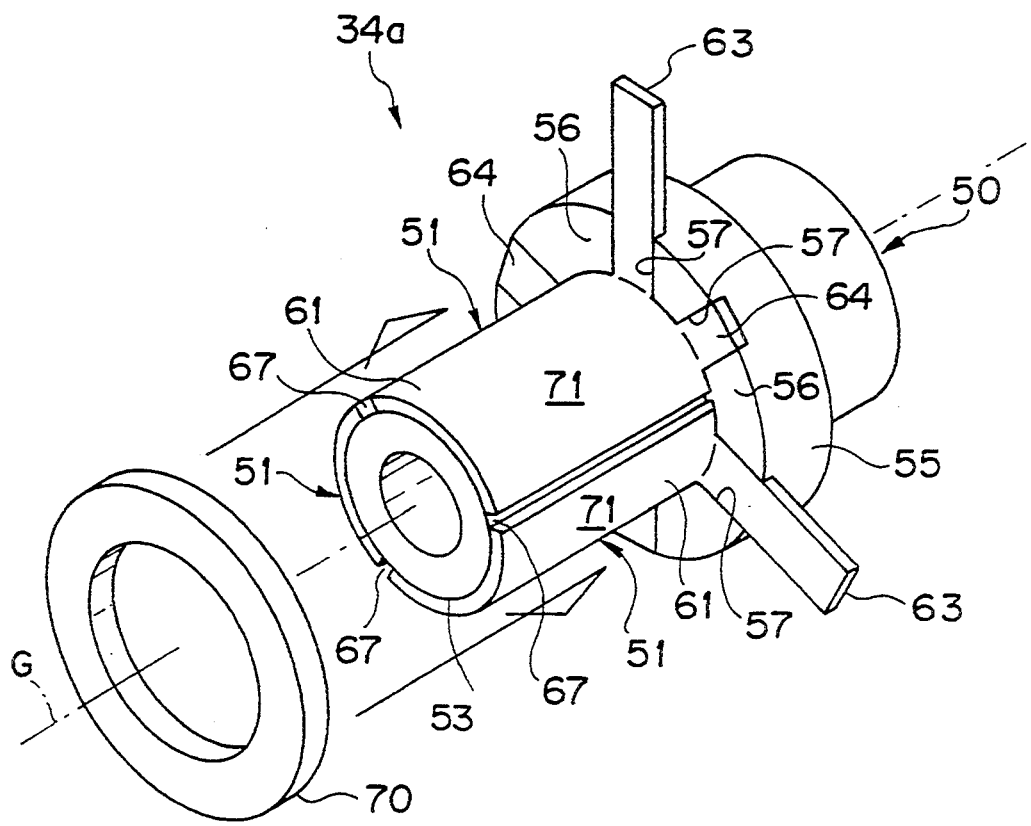
FIG. 4 is a perspective view showing a preassembled condition of a preassembled commutator in accordance with the second embodiment of the invention.
Figure 5:
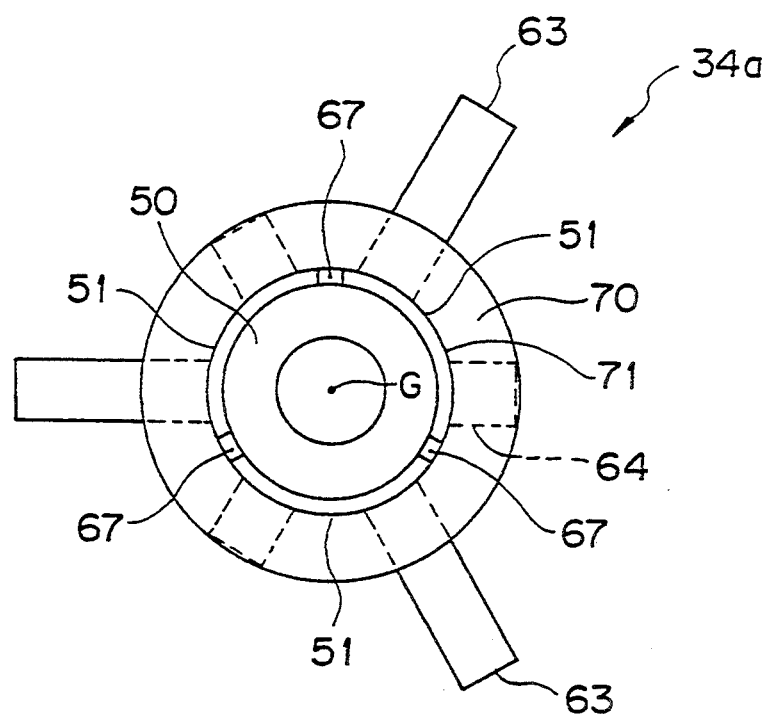
FIG. 5 is a side view showing the preassembled commutator shown in FIG. 4.

FIG. 4 is a perspective view showing the second embodiment of the invention, showing a preassembled condition of a preassembled commutator. FIG. 5 is a side view showing the preassembled commutator shown in FIG. 4.

A preassembled commutator 34a in accordance with the second embodiment is provided with an insulating ring member 70 in addition to the sleeve 50 and three commutator pieces 51 shown in the first embodiment.

The ring member 70 is brought into intimate contact with an outer circumferential surface 71 of each body portion 61 of each commutator piece 51 mounted on the sleeve body 50 for fastening the terminal portions 63 and the retainer portions 64 to the recesses 57. The ring member 70 is made of electrical insulating material such as polyethylene resin.

The terminal portions 63 and the retainer portions 64 of the commutator pieces 51 are mounted in the recesses 57 to thereby mount the commutator pieces 51 onto the sleeve body 50. Thereafter, the ring member 70 is mounted around the outer peripheral portion of the commutator pieces 51 as indicated by arrows in FIG. 4.

An inner diameter of the ring member 70 is substantially equal to or somewhat larger than an outer diameter of the outer circumferential surface 71 of the body portions 61 of the commutator pieces 51. Accordingly, the ring member 70 is advanced while depressing the outer circumferential surface 71 of the commutator pieces 51 inwardly and is positioned in place while coming into contact with the terminal portions 63, the retainer portions 64 and the side walls 56 of the flanged portion 55. Thus, the respective commutator pieces 51 are fastened to the cylindrical portion 53 of sleeve body 50.

As described above, since it is unnecessary to use means such as press-fitting or adhesives for fastening the terminal portions 63 and the retainer portions 64 to the recesses 57 if the ring member 70 is used, the assembling work may be facilitated, and at the same time, the commutator pieces 51 are firmly fastened in place.

Also, the second embodiment ensures the same effect as that of the first embodiment.

The third embodiment of the invention will now be described.

Figure 6:
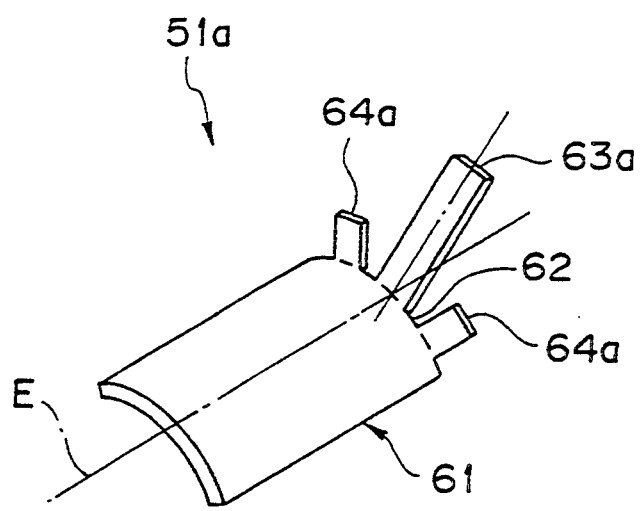
FIG. 6 is a perspective view showing a commutator piece in accordance with the third embodiment of the invention.
Figure 7:
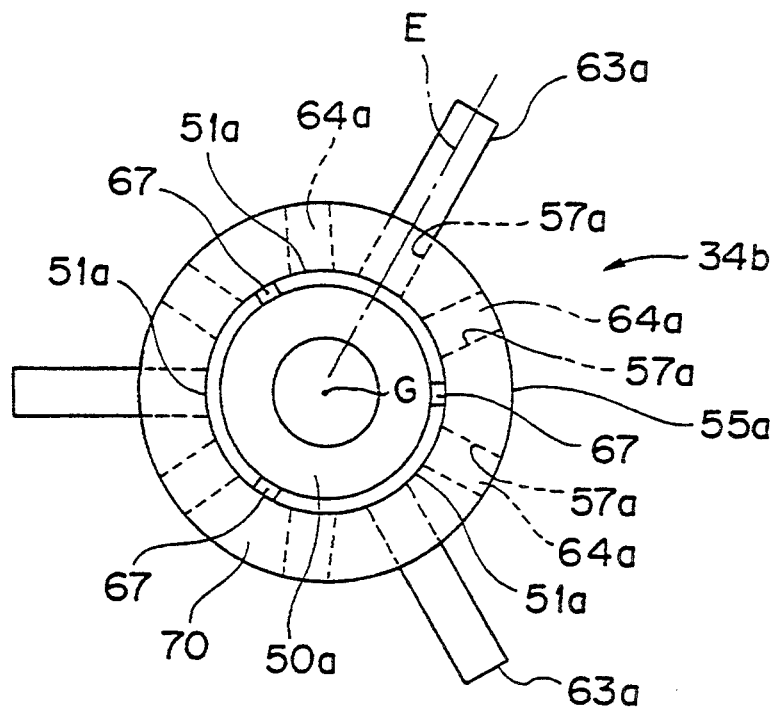
FIG. 7 is a side view showing a preassembled commutator including the commutator piece shown in FIG. 6.

The third embodiment is drawn to a modification of the commutator pieces used in the first and second embodiments. FIG. 6 is a perspective view of a commutator piece and FIG. 7 is a side view of a preassembled commutator including the commutator piece shown in FIG. 6 and is similar to FIG. 5.

The preassembled commutator 34b in accordance with the third embodiment is to be used in the cylindrical type miniature motor 20a as shown in FIG. 10. In case of the motor 20a, since there are no flat portions, there is no restriction to the space for the case where the connecting terminals 36 are disposed within an interior of the motor 20a. Accordingly, by rotating the cap member 29a relative to the housing 27a, the connecting terminals 36 may be rotated to thereby adjust the brushes 35 at desired positions.

Consequently, in the third embodiment, the mounting position of terminal portions 63a of commutator pieces 51a is not offset from the central position E of one edge 62 of each body portion 61. The terminal portions 63a are bent outwardly (for example, radially outwardly) at the central position E. Even with such an arrangement, it is possible to set the preassembled commutator 34b on the rotary shaft 26 so that the terminal portions 63a are interposed in the spaces between the adjacent armature windings 32. Also, if the position of the brushes 35 is adjusted in correspondence with the position of the slits 67 as described above, the electrical switching of the armature windings 32 may be smoothly attained by the commutator 34b.

A pair of retainer portions 64a are symmetrically formed on the right and left sides relative to the central position E on both sides of each terminal portion 63a. Each retainer portion 64a is bent outwardly (for example, radially outwardly) from one edge 62.

Meanwhile, recesses 57a are formed in positions in correspondence with the terminal portions 63a and the retainer portions 64a in a flanged portion 55a of a sleeve body 50a. Accordingly, also in accordance with the third embodiment, the same effect and advantage as those of the first and second embodiments may be insured.

Since the two retainer portions 64a are thus provided for one commutator piece 51a, it is possible to enhance the fastening strength of the commutator pieces 51a. Also, as shown in FIGS. 6 and 7, if the commutator pieces 51a having the terminal portions 63a and the retainer portions 64a are arranged symmetrically on the right and left sides relative to the central positions E, the manufacture and fabrication works are facilitated without any working errors.

Figure 8:
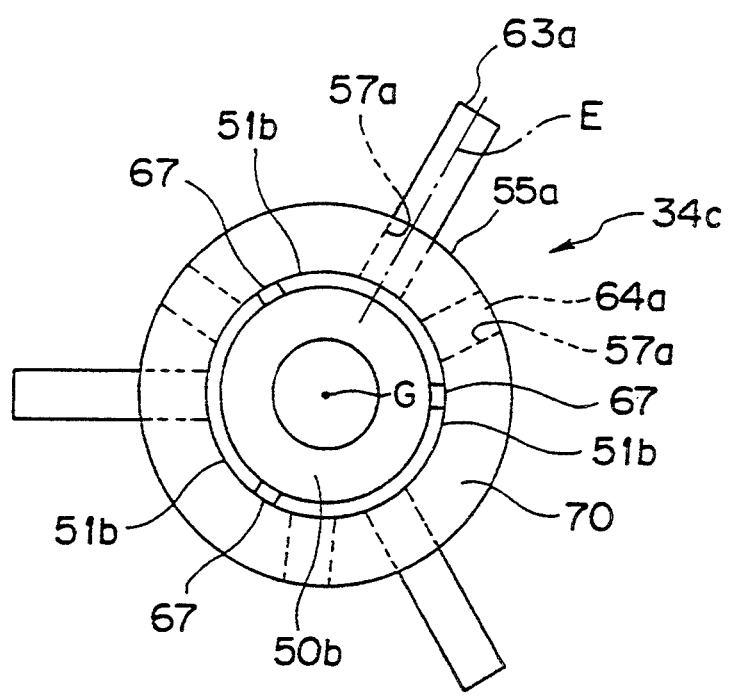
FIG. 8 is a side view showing a preassembled commutator in accordance with a fourth embodiment of the invention.

FIG. 8 is a side view showing a preassembled commutator 34c in accordance with a fourth embodiment of the invention and is similar to FIG. 5.

The preassembled commutator 34c is also used in the cylindrical type miniature motor 20a in the same way as in the third embodiment. The terminal portions 63a are mounted at the center positions E on the first edges of the body portions of the commutator pieces. In the third embodiment, the two retainer portions 64a are provided for one commutator piece 51a, but in the fourth embodiment, only one retainer portion 64a of the commutator piece 51b is provided close to the terminal portion 63a. The retainer portion 64a is bent radially outwardly from one edge 62. The recesses 57a are formed in positions in correspondence with the terminal portions 63a and the retainer portions 64a in the flanged portion 55a of the sleeve body 50b. The other structure of the fourth embodiment is the same as that of the third embodiment.

Also, in the fourth embodiment, the same effect and advantage as that of the third embodiment may be insured.

In the present invention, the number of the retainer portions 64, 64a provided in addition to the terminal portions 63, 63a may be one or more. Incidentally, in the case where the structure of the miniature motor is other type than the three-pole type, the number of the commutator pieces should correspond to the pole number.

Also, as in the respective embodiments, the recesses for receiving the terminal portions and the recesses for receiving the retainer portions may take the same cross section but may take different cross sections.

Incidentally, throughout the foregoing embodiments, the same reference numerals and characters are used for indicated the corresponding components or members.

Various details of the invention may be changed without departing from its spirit nor its scope. Further, the foregoing description of the embodiments according to the present invention is provided for the purpose of illustration only, and not for the purpose of limiting the invention as defined by the appended claims and their equivalents.

What is claimed is:

1. A miniature motor in which stators are mounted in an interior of a casing, and a preassembled commutator is provided on a rotor rotatably disposed to face the stators, said preassembled commutator comprising:
   a sleeve body having a cylindrical portion provided with a flanged portion, and a plurality of recesses, directed radially outward, in a side wall of said flanged portion, said sleeve body being made of insulating material and mounted on a rotary shaft of said rotor; and
   a plurality of conductive commutator pieces each having a body portion formed in an arcuate shape and mounted on an outer circumferential surface of said cylindrical portion, a terminal portion and at least one retainer portion, each of said terminal portion and said retainer portion being received in said recesses.

2. The miniature motor according to claim 1, wherein said cylindrical portion of said sleeve body has a long structure in an axial direction, said flanged portion is formed at one end of said cylindrical portion opposite to one end face of said cylindrical portion, said cylindrical portion is integrally formed on one side of said flanged portion, a proximal portion is formed on the other side of said flanged portion for contacting with a rotor core of said motor and positioning said preassembled commutator, and an outer diameter of said flanged portion is larger than outer diameters of said cylindrical portion and said proximal portion.

3. The miniature motor according to claim 1, wherein said plurality of recesses are formed radially outwardly from a centerline of said sleeve body.

4. The miniature motor according to claim 1, wherein an inner surface of each of said recesses is rectangular in cross section, and said inner surface is defined by a bottom and a pair of inner side walls which face each other and extend perpendicular to said bottom.

5. The miniature motor according to claim 4, wherein a width between said pair of inner side walls is substantially equal to or somewhat smaller than a width of said terminal portion and said retainer portion, whereby said terminal portion and said retainer portion are press-fit to said recesses, and each back surface and each side surface of said terminal portion and said retainer portion are brought into intimate contact with the bottoms and the inner side walls of said recesses respectively.

6. The miniature motor according to claim 4, wherein a width between said pair of inner walls is somewhat larger than a width of said terminal portion and said retainer portion, whereby said terminal portion and said retainer portion are fixed to said recesses with adhesives, and each back surface and each side surface of said terminal portion and said retainer portion are brought into intimate contact with the bottoms and the inner side walls of said recesses respectively.

7. The miniature motor according to claim 1, wherein an inner surface of each of the body portion of said commutator pieces has substantially the same radius of curvature as that of the outer circumferential surface, whereby said body portion comes into intimate contact with said outer circumferential surface.

8. The miniature motor according to claim 7, wherein when said commutator piece is mounted on said sleeve body, said body portion has such an axial length that its distal end is substantially flush with an end face of said cylindrical portion and such a circumferential length that a slit is formed so that a uniform dimension is kept between adjacent commutator pieces.

9. The miniature motor according to claim 1, wherein said sleeve body as a whole is integrally made of insulating material such as thermoplastics resin, and said commutator piece is made of conductive material such as copper and silver.

10. The miniature motor according to claim 1, wherein said terminal portion has an elongated structure extending outwardly for connection with an armature winding and said retainer portion has a shortened structure so as not to extend beyond an outer circumferential surface of said flanged portion.

11. The miniature motor according to claim 1, wherein the number of the commutator pieces is the same as that of poles of said motor.

12. The miniature motor according to claim 11, comprising a three-slot three-pole structure, wherein said preassembled commutator has three commutator pieces.

13. The miniature motor according to claim 12, wherein each commutator piece has one terminal portion and one retainer portion, and six recesses are formed in the sleeve body for receiving said terminal portions and said retainer portions.

14. The miniature motor according to claim 12, wherein said terminal portions and said retainer portions of said three commutator pieces are fixedly mounted within said recesses, respectively, and said three commutator pieces are uniformly arranged at 120° in the circumferential direction of said sleeve body.

15. The miniature motor according to claim 1, wherein said commutator further comprises an insulating ring member for being brought into intimate contact with the outer circumferential surface of said body portion of each commutator piece mounted on said sleeve body and for causing said terminal portion and said retainer portion to enter the recesses.

16. The miniature motor according to claim 15, wherein said ring member is made of insulating material such as polyethylene resin, an inner diameter of said ring member is substantially equal to or somewhat larger than an outer diameter of the outer circumferential surface of said body portion of said commutator piece, and said ring member is brought into contact with said terminal portion, said retainer portion and said side wall of said flanged portion.

17. The miniature motor according to claim 1, wherein a pair of flat portions for defining surfaces which are in parallel with each other and are formed in said casing of said miniature motor, and a mounting position of said terminal portion is offset from a center position of one edge of said body portion, whereby said terminal portion is interposed in a space between adjacent armature windings.

18. The miniature motor according to claim 17, wherein said preassembled commutator is incorporated into the motor, the terminal portions are mounted at 60° relative to a centerline of one pole of a rotor core.

19. The miniature motor according to claim 1, which is of a cylindrical type where said casing is cylindrical, wherein a mounting position of said terminal portion of said commutator piece is a center position of one edge of said body portion, said terminal portion is bent outwardly at said center position, and said preassembled commutator are mounted on the rotary shaft of said rotor for positional adjustment so that the terminal portion is interposed in a space between adjacent armature windings.

20. The miniature motor according to claim 19, wherein a pair of the retainer portions are formed on both sides of said terminal portion of said commutator piece, each of said retainer portions being bent radially outwardly from said one edge, and the recesses are formed in positions corresponding to said terminal portion and said retainer portions in said flanged portion of said sleeve body.

21. The miniature motor according to claim 20, wherein the commutator piece having the terminal portion and the retainer portions is symmetrical with respect to the center position on right and left sides.

22. The miniature motor according to claim 19, wherein one retainer portion of the commutator piece is formed in a vicinity of said terminal portion and bent radially outwardly from the one edge, and the recesses are formed in positions in correspondence with the terminal portion and the retainer portion.

23. A miniature motor in which stators are mounted in an interior of a casing, and a preassembled commutator is provided on a rotor rotatably disposed to face the stators, said preassembled commutator comprising:
 a sleeve body having a cylindrical portion provided with a flanged portion, and a plurality of recesses, directed radially outward, in a side wall of said flanged portion, said sleeve body being made of insulating material and mounted on a rotary shaft of said rotor; and
 a plurality of conductive commutator pieces each having a body portion formed in an arcuate shape and mounted on an outer circumferential surface of said cylindrical portion, a terminal portion and at least one retainer portion, each of said terminal portion and said retainer portion being received in said recesses,
 wherein said terminal portion is connected with an armature winding, said retainer portion is positioned in the vicinity of said terminal portion to thereby form an integral structure, each of said terminal portion and said retainer portion having a straight shape and being bent radially outward from an arcuate first edge of said body portion.

24. The miniature motor according to claim 23, wherein said commutator further comprises an insulating ring member for being brought into intimate contact with the outer circumferential surface of body portion of said commutator piece mounted on said sleeve body and for causing said terminal portion and said retainer portion to enter the recesses.

25. The miniature motor according to claim 24, wherein said ring member is made of insulating material such as polyethylene resin, an inner diameter of said ring member is at least as great as an outer diameter of the outer circumferential surface of said body portion of said commutator piece, and said ring member is brought into contact with said terminal portion, said retainer portion and said side wall of said flanged portion.

26. The miniature motor according to claim 25, comprising a three-slot three-pole structure, wherein said preassembled commutator has three commutator pieces, each commutator piece has one terminal portion and one retainer portion, and six recesses are formed in the sleeve body for receiving said terminal portions and said retainer portions.

27. The miniature motor according to claim 26, wherein said terminal portions and said retainer portions of said three commutator pieces are fixedly mounted within said recesses, respectively, and said three commutator pieces are uniformly arranged at 120° in the circumferential direction of said sleeve body.

28. The miniature motor according to claim 25, wherein when said commutator piece is mounted on said sleeve body, said body portion has such an axial length that its distal end is substantially flush with an end face of said cylindrical portion and such a circumferential length that a slit is formed so that a uniform dimension is kept between the adjacent commutator pieces.

29. The miniature motor according to claim 28, wherein said terminal portion has an elongated structure extending outward so as to be connected with the armature winding and said retainer portion has a shortened structure so as not to extend beyond an outer circumferential surface of said flanged portion.

* * * * *